US011206392B1

(12) United States Patent
Zuo et al.

(10) Patent No.: US 11,206,392 B1
(45) Date of Patent: Dec. 21, 2021

(54) IMAGE SENSOR WITH FRAME LEVEL BLACK LEVEL CALIBRATION

(71) Applicant: OMNIVISION TECHNOLOGIES, INC., Santa Clara, CA (US)

(72) Inventors: Liang Zuo, San Mateo, CA (US); Min Qu, Mountain View, CA (US); Xuelian Liu, Sunnyvale, CA (US); Rui Wang, San Jose, CA (US); Zhe Gao, San Jose, CA (US); Zhiyong Zhan, Fremont, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 16/931,194

(22) Filed: Jul. 16, 2020

(51) Int. Cl.
*H04N 17/00* (2006.01)
*H04N 5/3745* (2011.01)
*H04N 5/378* (2011.01)

(52) U.S. Cl.
CPC .......... *H04N 17/002* (2013.01); *H04N 5/378* (2013.01); *H04N 5/3745* (2013.01)

(58) Field of Classification Search
CPC ..... H04N 17/002; H04N 5/3745; H04N 5/378
See application file for complete search history.

(56) References Cited

U.S. PATENT DOCUMENTS

| | | | | |
|---|---|---|---|---|
| 5,736,886 A | * | 4/1998 | Mangelsdorf | G11C 27/024 327/310 |
| 10,165,210 B1 | * | 12/2018 | Wang | H04N 5/2176 |
| 2008/0054320 A1 | * | 3/2008 | Solhusvik | H04N 5/3575 257/292 |
| 2009/0295967 A1 | * | 12/2009 | Gomi | H04N 5/3598 348/308 |
| 2018/0070032 A1 | * | 3/2018 | Rotte | H04N 5/378 |

* cited by examiner

*Primary Examiner* — Michael E Teitelbaum
(74) *Attorney, Agent, or Firm* — Christensen O'Connor Johnson Kindness PLLC (57) ABSTRACT

An image sensor includes a pixel array with active rows of pixel cells, a black level calibration row with black image data generation circuits coupled to generate black image data signals representative of an absence of the incident light, and a dummy row with black level clamping circuits coupled to receive a black sun reference voltage to clamp bitlines of the pixel array, and a black level calibration circuit coupled to receive the black sun reference voltage to generate a black sun calibration voltage. A black sun feedback circuit is coupled to generate the black sun reference voltage in response to the black sun calibration voltage and a black level sample reference, and a black level sampling circuit is coupled to the bitlines to sample the black image data signals to generate the black level sample reference received by the black sun feedback circuit.

29 Claims, 5 Drawing Sheets

IMAGE SENSOR WITH FRAME LEVEL BLACK LEVEL CALIBRATION

BACKGROUND INFORMATION

Field of the Disclosure

This disclosure relates generally to image sensors, and in particular but not exclusively, relates to complementary metal-oxide semiconductor (CMOS) image sensors.

Background

Image sensors have become ubiquitous and are now widely used in digital cameras, cellular phones, security cameras, as well as, medical, automobile, and other applications. The technology used to manufacture image sensors, and in particular complementary metal-oxide-semiconductor (CMOS) image sensors, has continued to advance at a great pace. As image sensors are integrated into a broader range of electronic devices it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog signals from the column bitlines and converted to digital values to produce digital images (i.e., image data) representing the external scene.

It is noted that if an excessive amount of light impinges on the pixels of some CMOS sensors, the potential well of that pixel can spill over with photogenerated charge and cause an increase in the reference level, which can cause an error in the image sensor's output due to the subtraction of the reference level from the image signal level that occurs with correlated double sampling (CDS). In some instances, such as for instance in bright sunlight, the CDS subtraction operation results in a negative value, which causes the image sensor output to be set to zero causing "black spots" to appear in bright areas on the image sensor. A "black spot" occurring in the bright spot in an image sensor in this situation is sometimes referred to as an example of the black sun effect.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

Various examples directed to an imaging system with frame level black sun voltage self-calibration are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "lower," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when a layer is referred to as being "between" two layers, it can be the only layer between the two layers, or one or more intervening layers may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system are disclosed in which a black sun level self-calibration operation is performed by the imaging system prior to each frame readout. In various examples, the imaging system includes a pixel array with one or more dummy rows that include black level clamping circuits, which clamp the bitlines in the pixel array at a black sun reference voltage. The dummy row also includes a black level calibration circuit that is a replica of the black level clamping circuits. The black level calibration circuit is used to re-calibrate the black sun reference voltage of the imaging system before each frame readout of the pixel array. With the self-calibration implemented in the imaging system prior to each frame readout, variations such as in transistor conductance ($g_m$), and/or drain current ($I_d$), etc., on bitline currents caused by changes in temperature and process that can cause the black level clamp levels to change are accounted for frame by frame in accordance with the teachings of the present invention.

Figure 1:
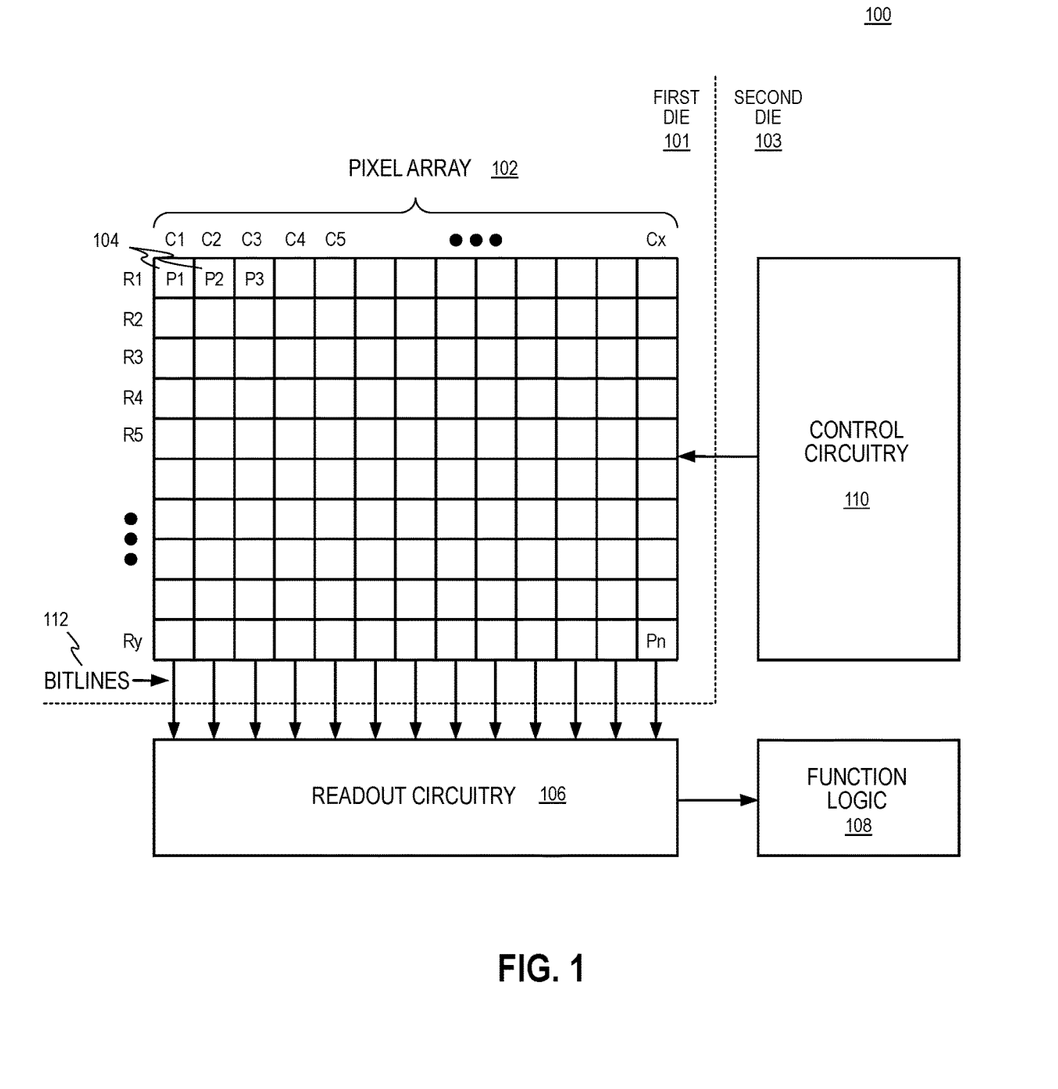
FIG. 1 illustrates one example of an imaging system with frame level black level self-calibration in accordance with the teachings of the present invention.

To illustrate, FIG. 1 illustrates one example of an imaging system 100 with frame level black sun voltage self-calibration in accordance with the teachings of the present invention. In the depicted example, imaging system 100 includes a pixel array 102, control circuitry 110, readout circuitry 106, and function logic 108. In one example, the pixel array 102 is included in a first die 101, such as for example a pixel die, and the control circuitry 110, readout circuitry 106, and function logic 108 are included in a second die 103, such as for example an application specific integrated circuit (ASIC) die, or another chip that provides circuitry that is coupled to support operation of the circuitry included in the pixel die. In one example, the first die 101 and the second die 103 coupled together and stacked in a stacked chip scheme. In the example, circuitry in the first die 101 and circuitry in the second die 103 may be coupled together between the two dice through hybrid bonds, through silicon vias (TSVs), and/or other suitable couplings.

In one example, pixel array 102 is a two-dimensional (2D) array including a plurality of pixel cells 104, which include photodiodes (e.g., P1, P2, . . . Pn). As illustrated in the depicted example, the pixel cells 104 are arranged into rows (e.g., R1 to Ry) and columns (e.g., C1 to Cx) to acquire image data of a person, place, object, etc., which can then be used to render an image of a person, place, object, etc.

In the example, each pixel cells 104 is configured to photogenerate image charge in response to incident light. After each pixel cell 104 has acquired its image charge, the corresponding image charge data is read out by readout circuitry 106 through bitlines 112. In the various examples, the image charge from each row of pixel cells 104 is read out in parallel through column bitlines 112 by readout circuitry. In the various examples, the image charge signals are analog signals that are converted to digital values, which are then transferred to function logic 106 in accordance with teachings of the present invention. The function logic 108 may store the image data or even manipulate the image data by applying post image effects (e.g., crop, rotate, remove red eye, adjust brightness, adjust contrast, or otherwise).

As will be discussed in greater detail below, imaging system 100 also includes circuitry to perform black sun voltage level self-calibration before each frame readout of the image data from the pixel array 102. For instance, in various examples, the pixel array 102 in the first die 101 includes black image data generation circuits, black level clamping circuits, and black level calibration circuits that work with a black level sampling circuit and a black sun feedback circuit in the second die 103 to perform the re-calibration of the black sun reference voltage used by the black level clamping circuits in the pixel array 102 prior to each frame readout. In so doing, variations in transistor conductance ($g_m$), and/or drain current ($I_d$), etc., on bitline currents caused by changes in temperature and process in the pixel array 102 can be reduced or minimized in accordance with the teachings of the present invention.

Figure 2:
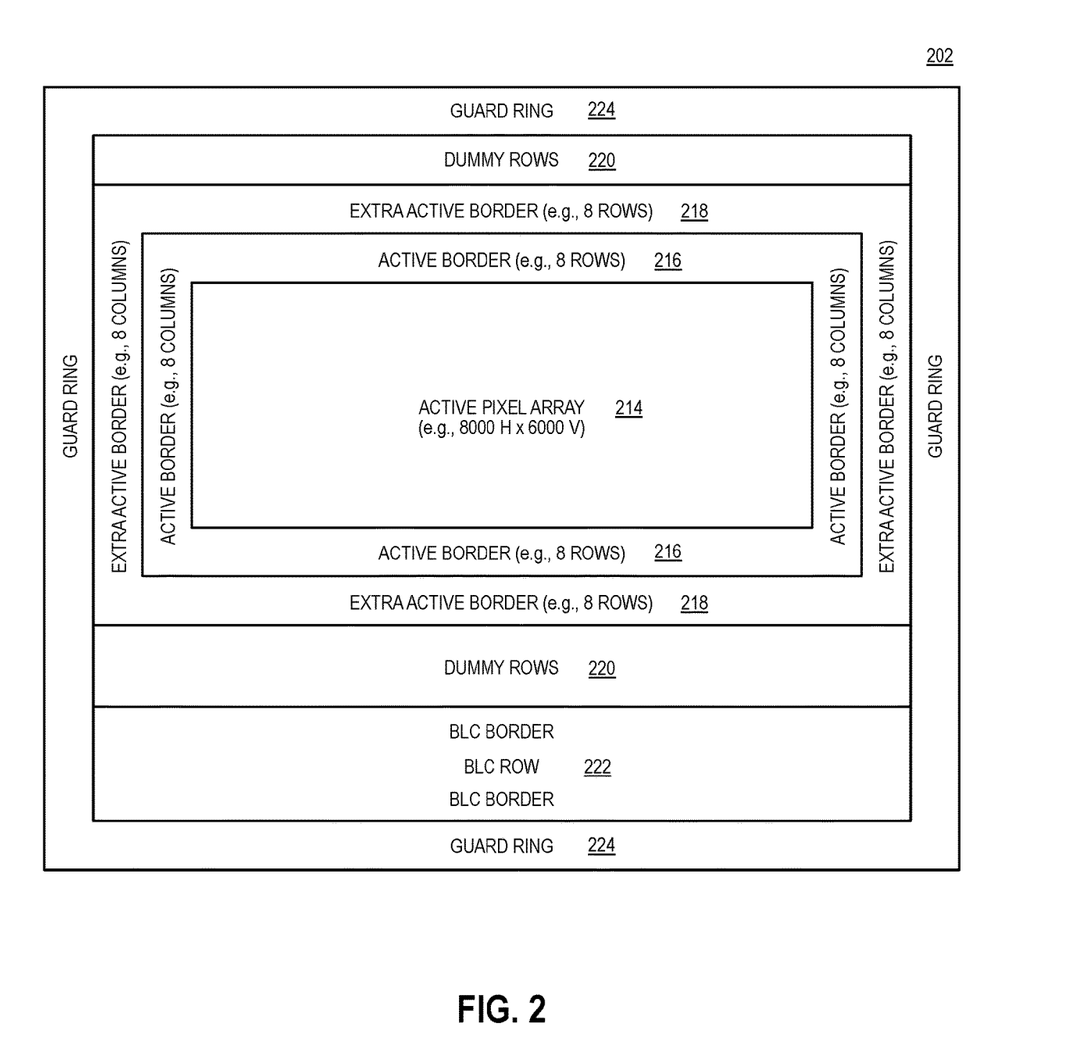
FIG. 2 illustrates one example of an arrangement of various regions in a pixel die including a pixel array in accordance with the teachings of the present disclosure.

FIG. 2 illustrates one example of an arrangement of various regions in a pixel die including a pixel array 202 in accordance with the teachings of the present disclosure. It is appreciated that the pixel array 202 of FIG. 2 may be one example of the pixel array 102 as shown in FIG. 1, and that similarly named and numbered elements described above are coupled and function similarly below.

As shown in the depicted example, pixel array 202 includes an active pixel array 214 portion, which in one example may be a 48 megapixel array that is 8000 pixels× 6000 pixels. Surrounding the active pixel array 214 is an active border 216, which in one example may include 8 rows and 8 columns. Surrounding the active border 216 is an extra active border 218, which in one example may include 8 rows and 8 columns. Above and below the extra active border 218 are dummy rows 220. In one example, there is a black level calibration region 222 below the dummy rows 220 on the bottom. In one example, the black level calibration region 222 includes a black level calibration (BLC) border below the dummy rows 220, and then a BLC row below the BLC border, and then another BLC border below the BLC row. In one example there is a guard ring 224 surrounding the dummy rows 220, extra active border 218, and the BLC region 222 as shown. It is appreciated that the numbers of rows and columns mentioned above are examples for explanation purposes, and that in there may be different numbers of rows and/or columns in other examples in accordance with the teachings of the present invention.

In one example, the array of pixel cells 104 that photo-generate image charge in response to incident light to acquire image data of a person, place, object, etc., which can then be used to render an image of a person, place, object, etc. as described above in FIG. 1 may be included in the active pixel array 214. As will be described, in one example, the dummy rows 220 may include black level clamping circuits and black level calibration circuits, and the BLC row included in the black level calibration region 222 may include black image data generation circuits to generate black image data signals used for black level self-calibration in accordance with the teachings of the present invention. The black image data signals generated in the BLC row may be used to provide the true black noise reference levels that can be sensed by pixel cells in the active pixel array 214 for self-calibration. In one example, in order to maintain true blackness of the black level calibration region 222, the black level calibration region 222 may be covered with a light blocking shield.

Figure 3:
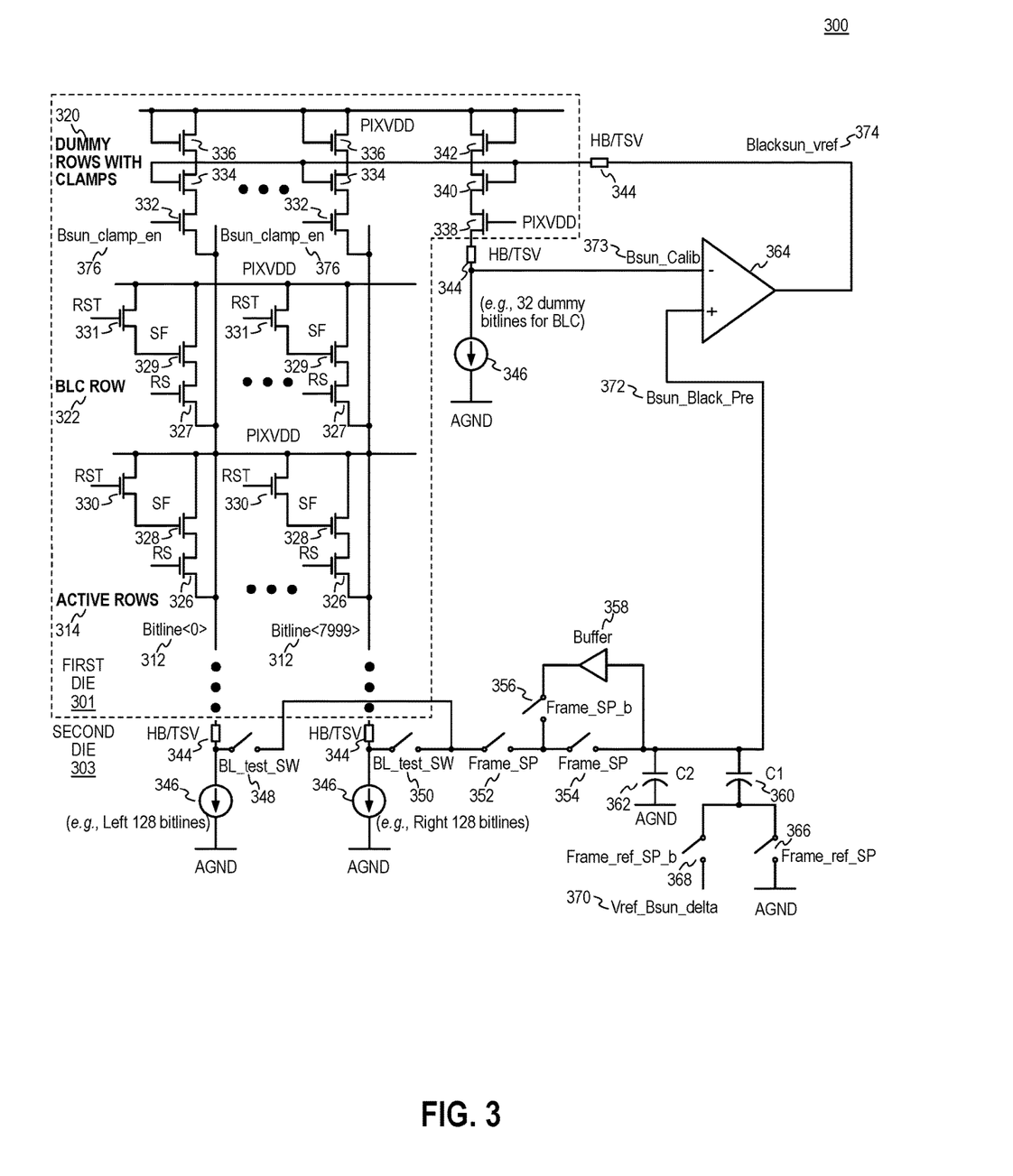
FIG. 3 illustrates one example of a schematic of an imaging system with frame level black level self-calibration in accordance with the teachings of the present disclosure.

FIG. 3 illustrates one example of a schematic of an imaging system 300 with frame level black level self-calibration in accordance with the teachings of the present disclosure. It is appreciated that the imaging system 300 of FIG. 3 may be one example of the imaging system 100 as shown in FIG. 1, and/or that the circuitry included in first die 301 may be an example of the pixel array 102 of FIG. 1 or the pixel array 202 of FIG. 2, and that similarly named and numbered elements described above are coupled and function similarly below.

As shown in the example depicted in FIG. 3, imaging system 300 includes a first die 301 coupled to a second die 303. In one example, the circuitry included in first die 301 may be coupled to the circuitry included in second die 303 through hybrid bonds/through-silicon vias (TSVs) 344, or other suitable coupling technology. In the example, the first die 301 is a pixel chip that includes a pixel array including dummy rows with clamps 320, a black level calibration (BLC) row 322, and active rows 314. The active rows 314 include pixel cells, each of which includes a reset transistor 330 coupled to a voltage supply PIXVDD, a source follower transistor 328 coupled the voltage supply PIXVDD and a gate coupled to the reset transistor 330, and a row select transistor 326 coupled between the source follower transistor 328 and a bitline 312. In the depicted example, the active pixel array includes 8,000 columns for explanation purposes, and as such, there are 8,000 bitlines 312, which are labeled in FIG. 3 as Bitline<0> to Bitline<7999>. In other examples, it is appreciated of course that there may be a different number of bitlines 312 in accordance with the teachings of the present invention. In addition, it is appreciated that each pixel cell may also include one or more photodiodes (not shown) that generate image charge in response to incident light that are coupled to the gate of the source follower transistor 328. In those examples, there may also be one or more respective transfer transistors (not shown) and a floating diffusion (not shown) coupled between the one or more photodiodes and the gate of the source follower transistor 328 of each pixel cell in the active rows 314.

The example illustrated in FIG. 3 also illustrates that the BLC row 322 includes a plurality of black image data generation circuits that are coupled to generate black image data signals that are representative of an absence of the incident light (i.e., complete darkness) for calibration. As will be described, the black image data generation circuits included in BLC row 322 are coupled to generate black image data signals that represent true black noise reference levels that can be sensed by pixel cells in the active rows 314. In the example, each one of the plurality of the black image data generation circuits includes a black image reset transistor 331 coupled to the voltage supply PIXVDD, a black image source follower transistor 329 coupled to the voltage supply PIXVDD and having a gate coupled to the black image reset transistor 331, and a black image row select transistor 327 coupled between the black image source follower transistor 329 and a respective bitline 312, which is coupled to be sampled by a black level sampling circuit as will be described below.

In particular, the black image data signals that are coupled be received by each respective bitline 312 and are sampled and held during self-calibration operation of imaging system 300 prior to each frame readout of the pixel array in accordance with the teachings of the present invention. In one example, it is noted that a grouping of 128 bitlines on the left end or left side of the pixel array are sampled for the black image data signals, and that a grouping of 128 bitlines on the right end or right side of the pixel array may also be sampled for the black image data signals during the self-calibration operation of imaging system 300 prior to each frame readout of the pixel array in accordance with the teachings of the present invention. In other examples, it is appreciated of course that a different number of bitlines may be sampled during the self-calibration operation in accordance with the teachings of the present invention.

As shown in the example depicted in FIG. 3, dummy row 320 includes a plurality of black level clamping circuits coupled to receive a black sun reference voltage Blacksun_vref 374 to clamp respective bitlines 312 of the pixel array to prevent the black sun effect in the imaging system 300. In the example, each one of the plurality of black level clamping circuits includes a black level clamping supply transistor 336 coupled to the voltage supply PIXVDD, a black level clamping source follower transistor 334 coupled to the black level clamping supply transistor 336 and having a gate coupled to receive the black sun reference voltage Blacksun_vref 374, and a black level clamping enable transistor 332 coupled between the black level clamping source follower 334 and a respective one of the plurality of bitlines 312. In operation, each one of the plurality of black level clamping circuits is enabled in response to a black level clamping enable signal Bsun_clamp_en 376 to clamp the respective bitline 312 in response to the black sun reference voltage Blacksun_vref 374.

Continuing with the example depicted in FIG. 3, dummy row 320 also includes a black level calibration circuit that is also coupled to receive the black sun reference voltage Blacksun_vref 374 to generate a black sun calibration voltage Bsun_Calib 373. In one example, the black level calibration circuit is a replica of each one of the plurality of black level clamping circuits in dummy row 320. As such, the black level calibration circuit includes a black level calibration supply transistor 342 coupled to the voltage supply PIXVDD, a black level calibration source follower transistor 340 coupled to the black level calibration supply transistor 342 and having a gate coupled to receive the black sun reference voltage Blacksun_vref 374, and a black level calibration enable transistor 338 coupled between the black level calibration source follower transistor 340 and a dummy bitline, which is coupled to a black sun feedback circuit 364. In one example, the gate of black level calibration enable transistor 338 is tied to the voltage supply PIXVDD such that the black level calibration circuit is always enabled in the example.

As will be discussed in greater detail below, with black level calibration circuit being a replica of each one of the plurality of black level clamping circuits in dummy row 320, variations in transistor conductance ($g_m$), and/or drain current ($I_d$), etc., affecting the transistors in the black level clamping circuits will therefore also similarly affect the transistors in the black level calibration circuit. As such, the self-calibration of the imaging system 300 accounts for and therefore cancels out the temperature and process variations affecting the black level clamping circuits by utilizing the black level calibration circuit in accordance with the teachings of the present invention.

In one example, it is noted that there may be a grouping of 32 dummy bitlines coupled to a plurality of black level calibration circuits included in dummy row 320. In the example, the 32 dummy bitlines are each coupled to a respective black level calibration enable transistor 338, which are coupled to black sun feedback circuit 364. In other examples, it is appreciated of course that a different number of dummy bitlines may be coupled to black sun feedback circuit 364 in accordance with the teachings of the present invention.

In the example illustrated in FIG. 3, imaging system 300 also includes the second die 303, which is separate from and coupled to the first die 301. In the one example, the second die 303 includes the black sun feedback circuit 364 that is coupled to generate the black sun reference voltage Blacksun_vref 374 in response to the black sun calibration voltage Bsun_Calib 373 and a black level sample reference Bsun_Black_Pre 372. In one example, the black sun feedback circuit 364 includes an operational amplifier having an inverting input coupled to receive the black sun calibration voltage Bsun_Calib 373, a non-inverting input coupled to receive the black level sample reference Bsun_Black_Pre 372, and an output coupled to generate the black sun reference voltage Blacksun_vref 374 in response to the black sun calibration voltage Bsun_Calib 373 and the black level sample reference Bsun_Black_Pre 372. In the depicted example, the inverting input of the operational amplifier is coupled to receive the black sun calibration voltage Bsun_Calib 373 from the one or more dummy bitlines coupled to the one or more black level calibration circuits included in dummy row 320 of the first die 301 through one or more hybrid bonds/TSVs 344. In the example, the one or more dummy bitlines are coupled to a respective current source 346 to ground in the second die 303 as shown.

In the depicted example, second die 303 also includes a black level sampling circuit coupled to the plurality of bitlines 312 to sample and hold the black image data signals generated from the black image data generation circuits included in the BLC row 322 in the first die 301 through hybrid bonds/TSVs 344 to generate the black level sample reference Bsun_Black_Pre 372, which is coupled to be received by the black sun feedback circuit 374 as discussed above. In the example, each of the bitlines 312 is coupled to a respective current source 346 to ground in the second die 303 as shown.

As shown in the illustrated example, in operation, the black level sampling circuit includes a first capacitor C1 360 coupled to the plurality of bitlines 312 through a plurality of bitline switches to be charged and sample the black image data signal when the plurality of bitline switches are closed. In one example, the plurality of bitline switches include BL_test_SW 348, BL_test_SW 350, Frame_SP 352, and Frame_SP 354, which are coupled between the plurality of bitlines 312 and the first capacitor C1 360 as shown. The first capacitor C1 360 is coupled to hold the black image data signal when the plurality of bitline switches are opened. The depicted example also illustrates a second capacitance C2, which represents other capacitance that may be included in the black level sampling circuit and coupled to the first capacitor C1 360. Also illustrated in the example shown in FIG. 3 is a buffer 358 and switch 356 that are coupled across switch 354. In one example, the switch 356 is switched in response to a Frame_SB_b signal, which in one example is a complement of the Frame_SP signal.

In one example, the black level sampling circuit further includes margin offset switching circuitry coupled to the first capacitor C1 360. In one example, the margin offset switch circuitry includes switch 366 and switch 368 coupled to the first capacitor C1 360 as shown. In the example, switch 366 is coupled between first capacitor C1 360 and ground, and is switched in response to a signal Frame_ref_SP. Switch 368 is coupled between first capacitor C1 360 and a margin offset voltage Vref_Bsun_delta 370, and switched in response to a signal Frame_ref_SP b. In one example, the signal Frame_ref_SP and the signal Frame_ref_SP b are complements of one another such that only one of switches 366 and 368 can be closed at a time.

In one example, in operation, the margin offset switching circuitry is configured to couple the first capacitor C1 360 to the margin offset voltage Vref_Bsun_delta 370 through switch 368 concurrently with the plurality of bitline switches BL_test_SW 348, BL_test_SW 350, Frame_SP 352, and Frame_SP 354 being closed. In the example, the margin offset switching circuitry is further configured to couple the first capacitor C1 360 to ground through switch 366 concurrently with the plurality of bitline switches BL_test_SW 348, BL_test_SW 350, Frame_SP 352, and Frame_SP 354 being opened. In one example, the first capacitor C1 360 is also configured to generate the black level sample reference Bsun_Black_Pre 372 in response to the margin offset switching circuitry coupling the first capacitor C1 360 to ground. As will be discussed, in operation, the black level sampling circuit and the black sun feedback circuit are configured to re-sample the black image data signals generated from the BLC row 322 and re-generate the black sun reference voltage prior to each frame readout of the image date from the pixel array.

Figure 4:
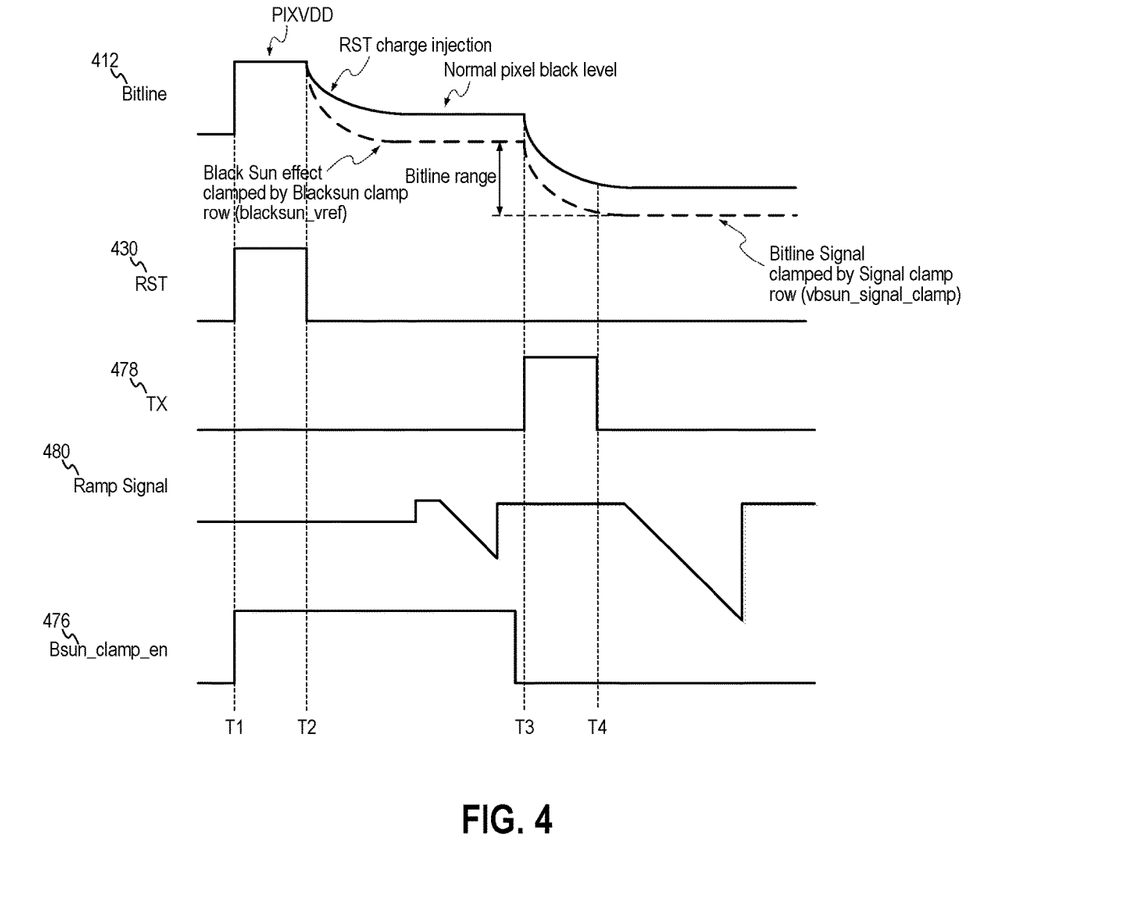
FIG. 4 illustrates one example of a timing diagram illustrating the relative relationships between signals in an imaging system exposed to bright sunlight accordance with the teachings of the present invention.

To illustrate, FIG. 4 illustrates one example of a timing diagram illustrating the relative relationships between signals in an imaging system exposed to bright sunlight accordance with the teachings of the present invention. It is appreciated the example signals illustrated in FIG. 4 may be examples of signals found in imaging system 300 as shown in FIG. 3, or examples of signals found in the pixel array 202 as shown in FIG. 2, or examples of signals found in the imaging system 100 as shown in FIG. 1, and that similarly named and numbered elements described above may therefore be coupled and function similarly below.

As illustrated, FIG. 4 shows a bitline signal 412, a reset signal RST 430, a transfer signal TX 478, a ramp signal 480 and a black level clamping enable signal Bsun_clamp_en 476. At time T1, the black level clamping enable signal Bsun_clamp_en 476 and the reset signal RST 430 are enabled. Also at this time the reset signal RST 430 pulls the bitline signal 412 up towards the supply voltage PIXVDD. At time T2, the reset signal RST 430 is turned off. As such, the bitline signal 412 begins to drop as shown due to charge injection caused by the reset signal RST 430 going low.

During normal operation, with the black level clamping enable signal Bsun_clamp_en 476 still enabled, columns suffering from the black sun effect will be clamped to the black sun reference voltage Blacksun_vref 374 by the black level clamping circuits in dummy rows 320 so that the black sun effect will not interfere with a normal pixel black level. As shown in the example, the clamp range is determined by the black sun reference voltage Blacksun_vref 374 (upper bound) and a vbsun_signal_clamp voltage (lower bound, not shown). In the example, the clamp voltage range of black sun columns is maintained to be equal to or greater than the required bitline range to prevent the undesired black sun effect during the sampling of the correlated double sampling (CDS) reference level, even when there is bright sunlight. As shown in the example, a first ramp event occurs in ramp signal 480 prior to time T3, during which time the analog-to-digital conversion (ADC) operation is performed to obtain the digital representation of the CDS reference level (e.g., black level). Once the sampling of the correlated double sampling (CDS) reference level is complete, the black level clamping enable signal Bsun_clamp_en 476 may then be disabled, which is shown in the example occurring prior to time T3.

At time T3, the transfer TX signal 478 is then turned on, during which time photogenerated image charge is transferred from the photodiodes to the gate of the source follower transistors 328, which is shown with the bitline signal 412 dropping in response to the photogenerated image charge. At time T4, the transfer TX signal 478 is then turned off, and the image signal value of the CDS operation may be obtained, as indicated with the second ramp event occurring in the ramp signal 480 after time T4, during which time the ADC operation is performed to obtain the digital representation of the CDS image signal level.

Figure 5:
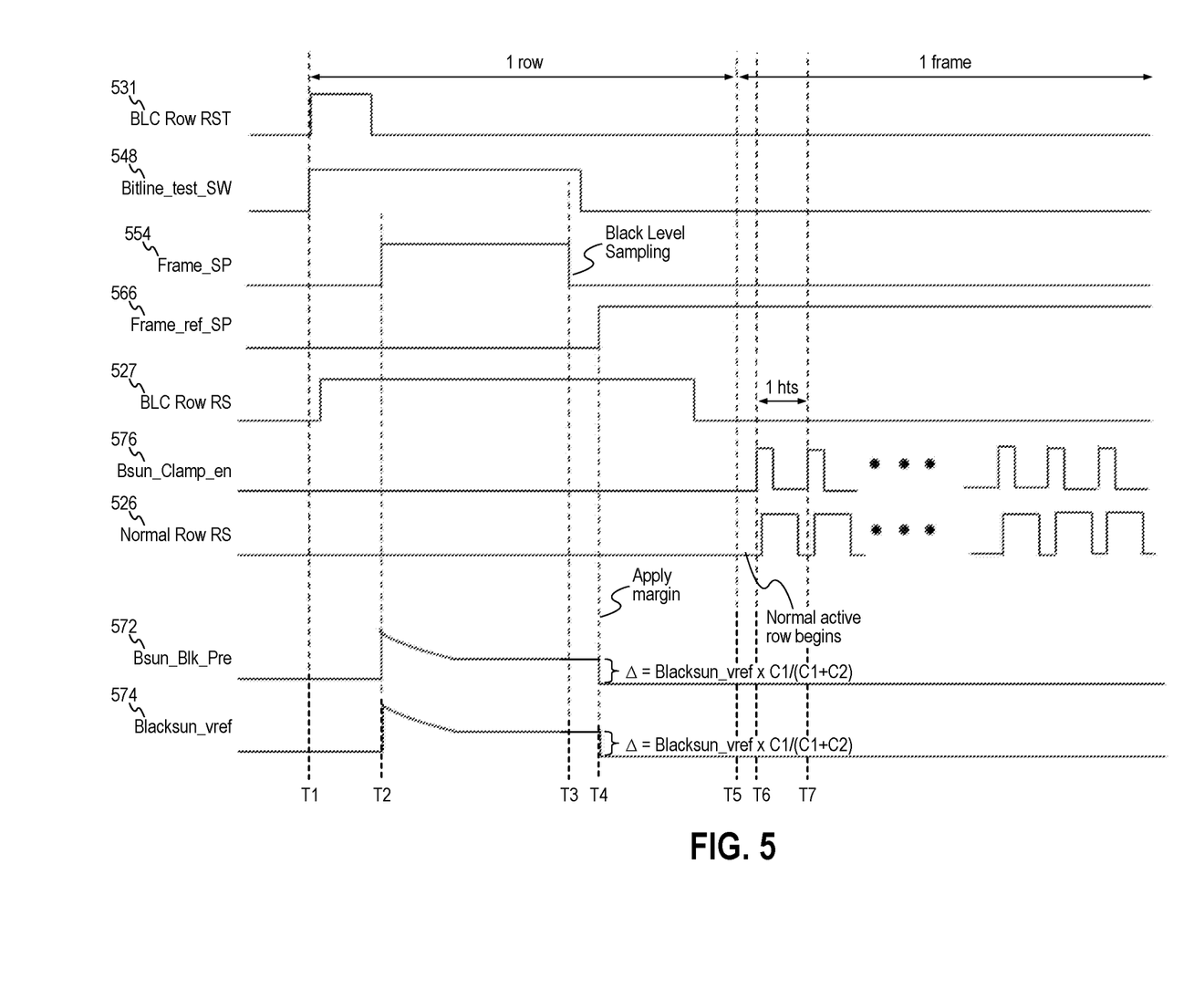
FIG. 5 illustrates one example of a timing diagram illustrating the relative relationships between signals an imaging system with black level self-calibration performed before each frame readout of a pixel array in accordance with the teachings of the present invention.

FIG. 5 illustrates one example of a timing diagram illustrating the relative relationships between signals an imaging system with black level self-calibration performed before each frame readout of a pixel array in accordance with the teachings of the present invention. It is appreciated the example signals illustrated in FIG. 5 may be examples of signals found in imaging system 300 as shown in FIG. 3, or examples of signals found in the pixel array 202 as shown in FIG. 2, or examples of signals found in the imaging system 100 as shown in FIG. 1, and that similarly named and numbered elements described above may therefore be coupled and function similarly below.

As illustrated, FIG. 5 shows a BLC Row RST signal 531, a Bitline_test_SW signal 548, a Frame_SP signal 554, a Frame_ref_SP signal 566, a BLC Row RS signal 527, a Bsun_Clamp_en signal 576, a Normal Row RS signal 526, a Bsun_Blk_Pre signal 572, and a Blacksun_vref signal 574.

At time T1, the row timing for a first row begins before each frame readout of the image sensor. At this time before each frame readout, the black image data signals generated from the black image data generation circuits included in the BLC row 322 are sampled and held by the black level sampling circuit prior to each frame readout of the pixel array to begin self-calibration in accordance with the teachings of the present invention. Thus, occurring at time T1, the BLC Row RST signal 531, Bitline_test_SW signal 548, and BLC Row RS signal 527 transition to an on state. At time T2, the Frame_SP signal 554 transitions to the on state. Therefore, at time T2, the plurality of bitline switches BL_test_SW 348, BL_test_SW 350, Frame_SP 352, and Frame_SP 354, which are coupled between the plurality of bitlines 312 and the first capacitor C1 360, are all turned on enabling the first capacitor C1 360 to be charged and sample the black image data signals from the plurality of bitlines 312. Accordingly, with the first capacitor C1 360 now coupled to sample the black image data signals, the Bsun_Blk_Pre 572 and therefore the Blacksun_vref 574 signal rise at time T2 as shown. It is noted that at this time, the Frame_ref_SP 566 signal is turned off. As such, the Frame_ref_SP switch 366 is turned off and the Frame_ref_SP b switch 368 is turned on to apply the Vref_Bsun_delta 370 margin voltage to the other end of the first capacitor C1 360 while sampling of the black image data signals. In one example, the Vref_Bsun_delta 370 voltage is margin voltage that can be utilized to generate the Bsun_Black_Pre signal 372. In various examples, it is appreciated that with the self-calibration performed by an imaging system in accordance with the teachings of the present invention, the magnitude of the Vref_Bsun_delta 370 margin voltage can be reduced compared to imaging systems without self-calibration prior to each frame in accordance with the teachings of the present invention.

At time T3, the Frame_SP 554 transitions to the off state and then the Bitline_test_SW signal 548 transitions to the off state. Thus, the plurality of bitline switches BL_test_SW 348, BL_test_SW 350, Frame_SP 352, and Frame_SP 354 are now opened and the black image data signals are now held in the first capacitor C1 360 to complete the Black level sampling operation.

At time T4, the Frame_ref_SP 566 signal is turned on, which applies the margin offset voltage to the black image data signal that is now held in the first capacitor C1 360 by removing the Vref_Bsun_delta 370 margin voltage from the first capacitor C1 360 by turning on the Frame_ref_SP switch 366 and turning off the Frame_ref_SP b switch 368. As shown, by applying margin offset voltage, the change or delta in the Bsun_Blk_Pre 572 and the Blacksun_vref 574 signals in one example can be approximated with Equation (1) below:

$$\Delta = \text{Blacksun\_vref} \times \frac{C_1}{(C_1 + C_2)} \quad (1)$$

At time T5, the row timing of the first row is complete and the self-calibration or re-calibration of the Blacksun_vref 574 signal prior to each frame readout is therefore also completed in accordance with the teachings of the present invention. As such, normal active row readouts for each frame may begin after time T5. This is illustrated in FIG. 5 with the Bsun_Clamp_en 576 and Normal Row RS 526 signal pulsing high for each row readout during a frame at times T6 and T7, and so on, for this reset of the frame in accordance with the teachings of the present invention. Prior to the next frame, processing will repeat back to time T1 to re-calibrate the Blacksun_vref 574 signal prior to next frame readout in accordance with the teachings of the present invention.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An image sensor, comprising:
    a pixel array, including:
        a plurality of active rows of pixel cells coupled to generate image data in response to incident light;
        a black level calibration row including a plurality of black image data generation circuits coupled to generate black image data signals representative of an absence of the incident light; and
        a dummy row including:
            a plurality of black level clamping circuits coupled to receive a black sun reference voltage to clamp a plurality of bitlines of the pixel array; and
            a black level calibration circuit coupled to receive the black sun reference voltage to generate a black sun calibration voltage;
    a black sun feedback circuit coupled to generate the black sun reference voltage in response to the black sun calibration voltage and a black level sample reference; and
    a black level sampling circuit coupled to the plurality of bitlines to sample the black image data signals generated from the black level calibration row to generate the black level sample reference coupled to be received by the black sun feedback circuit.

2. The image sensor of claim 1, wherein the black level sampling circuit comprises a first capacitor coupled to the plurality of bitlines through a plurality of bitline switches to sample the black image data signal when the plurality of bitline switches are closed, wherein the first capacitor coupled to hold the black image data signal when the plurality of bitline switches are opened.

3. The image sensor of claim 2, wherein the black level sampling circuit further comprises margin offset switching circuitry coupled to the first capacitor,
wherein the margin offset switching circuitry is configured to couple the first capacitor to a margin offset voltage concurrently with the plurality of bitline switches being closed,
wherein the margin offset switching circuitry is configured to couple the first capacitor to ground concurrently with the plurality of bitline switches being opened, wherein the first capacitor is configured to generate the black level sample reference in response to the margin offset switching circuitry coupling the first capacitor to ground.

4. The image sensor of claim 3, wherein the black level sampling circuit and the black sun feedback circuit are configured to resample the black image data signals generated from the black level calibration row and regenerate the black sun reference voltage prior to each frame readout of the image date from the pixel array.

5. The image sensor of claim 4, wherein the plurality of bitlines includes a first grouping of bitlines, wherein the black level sampling circuit is coupled to the first grouping of bitlines through the plurality of bitline switches to sample and hold the black image data signal.

6. The image sensor of claim 5, wherein the plurality of bitlines further includes a second grouping of bitlines, wherein the black level sampling circuit is coupled to the first grouping of bitlines and the second grouping of bitlines through the plurality of bitline switches to sample and hold the black image data signal.

7. The image sensor of claim 6, wherein the first grouping of bitlines is on one end of the pixel array, and wherein the second grouping of bitlines is on an opposite end of the pixel array.

8. The image sensor of claim 7, wherein the first grouping of bitlines comprises 128 bitlines on said one end of the pixel array, and wherein the second grouping of bitlines comprises 128 bitlines on said opposite end of the pixel array.

9. The image sensor of claim 1, wherein each one of the plurality of the black image data generation circuits comprises:
a black image reset transistor coupled to a voltage supply;
a black image source follower transistor coupled to the voltage supply and having a gate coupled to the black image reset transistor; and
a black image row select transistor coupled between the black image source follower transistor and the black level sampling circuit.

10. The image sensor of claim 1, wherein the black level calibration circuit is one of a plurality of black level calibration circuits, wherein each one of the plurality of black level calibration circuits is coupled to a respective one of a third grouping of bitlines included in the plurality of bitlines, wherein the black sun feedback circuit is coupled to receive the black sun calibration voltage from the plurality of black level calibration circuits through the third grouping of bitlines to generate the to generate the black sun reference voltage.

11. The image sensor of claim 10, wherein the third grouping of bitlines comprises 32 dummy bitlines of the plurality of bitlines.

12. The image sensor of claim 1, wherein each one of the plurality of black level clamping circuits comprises:
a black level clamping supply transistor coupled to a voltage supply;
a black level clamping source follower transistor coupled to the black level clamping supply transistor and having a gate coupled to receive the black sun reference voltage; and
a black level clamping enable transistor coupled between the black level clamping source follower transistor and a respective one of the plurality of bitlines.

13. The image sensor of claim 12, wherein the black level calibration circuit is a replica of each one of the plurality of black level clamping circuits, wherein the black level calibration circuit comprises:
a black level calibration supply transistor coupled to the voltage supply;
a black level calibration source follower transistor coupled to the black level calibration supply transistor and having a gate coupled to receive the black sun reference voltage; and
a black level calibration enable transistor coupled between the black level calibration source follower transistor and the black sun feedback circuit.

14. The image sensor of claim 1, wherein the black sun feedback circuit comprises an operational amplifier having an inverting input coupled to receive the black sun calibration voltage, a non-inverting input coupled to receive the black level sample reference, and an output coupled to generate the black sun reference voltage in response to the black sun calibration voltage and the black level sample reference.

15. An imaging system, comprising:
a first die including a pixel array, wherein the pixel array comprises:
a plurality of active rows of pixel cells coupled to generate image data in response to incident light;
a black level calibration row including a plurality of black image data generation circuits coupled to generate black image data signals representative of an absence of the incident light; and
a dummy row including:
a plurality of black level clamping circuits coupled to receive a black sun reference voltage to clamp a plurality of bitlines of the pixel array; and
a black level calibration circuit coupled to receive the black sun reference voltage to generate a black sun calibration voltage; and
a second die coupled to the first die, wherein the second die comprises:
a black sun feedback circuit coupled to generate the black sun reference voltage in response to the black sun calibration voltage and a black level sample reference; and
a black level sampling circuit coupled to the plurality of bitlines to sample the black image data signals generated from the black level calibration row to generate the black level sample reference coupled to be received by the black sun feedback circuit.

16. The imaging system of claim 15, further comprising:
control circuitry coupled to the pixel array to control operation of the pixel array;
a readout circuitry coupled to the pixel array to read out the image data from the pixel cells through the plurality of bitlines; and
function logic coupled to the readout circuitry to store the image data read out from the pixel array.

17. The imaging system of claim 15, wherein the black level sampling circuit comprises a first capacitor coupled to the plurality of bitlines through a plurality of bitline switches to sample the black image data signal when the plurality of bitline switches are closed, wherein the first capacitor coupled to hold the black image data signal when the plurality of bitline switches are opened.

18. The imaging system of claim 17, wherein the black level sampling circuit further comprises margin offset switching circuitry coupled to the first capacitor,
wherein the margin offset switching circuitry is configured to couple the first capacitor to a margin offset voltage concurrently with the plurality of bitline switches being closed,
wherein the margin offset switching circuitry is configured to couple the first capacitor to ground concurrently with the plurality of bitline switches being opened, wherein the first capacitor is configured to generate the black level sample reference in response to the margin offset switching circuitry coupling the first capacitor to ground.

19. The imaging system of claim 18, wherein the black level sampling circuit and the black sun feedback circuit are configured to resample the black image data signals generated from the black level calibration row and regenerate the black sun reference voltage prior to each frame readout of the image date from the pixel array.

20. The imaging system of claim 19, wherein the plurality of bitlines includes a first grouping of bitlines, wherein the black level sampling circuit is coupled to the first grouping of bitlines through the plurality of bitline switches to sample and hold the black image data signal.

21. The imaging system of claim 20, wherein the plurality of bitlines further includes a second grouping of bitlines, wherein the black level sampling circuit is coupled to the first grouping of bitlines and the second grouping of bitlines through the plurality of bitline switches to sample and hold the black image data signal.

22. The imaging system of claim 21, wherein the first grouping of bitlines is on one end of the pixel array, and wherein the second grouping of bitlines is on an opposite end of the pixel array.

23. The imaging system of claim 22, wherein the first grouping of bitlines comprises 128 bitlines on said one end of the pixel array, and wherein the second grouping of bitlines comprises 128 bitlines on said opposite end of the pixel array.

24. The imaging system of claim 15, wherein each one of the plurality of the black image data generation circuits comprises:
a black image reset transistor coupled to a voltage supply;
a black image source follower transistor coupled to the voltage supply and having a gate coupled to the black image reset transistor; and
a black image row select transistor coupled between the black image source follower transistor the black level sampling circuit.

25. The imaging system of claim 15, wherein the black level calibration circuit is one of a plurality of black level calibration circuits, wherein each one of the plurality of black level calibration circuits is coupled to a respective one of a third grouping of bitlines included in the plurality of bitlines, wherein the black sun feedback circuit is coupled to receive the black sun calibration voltage from the plurality of black level calibration circuits through the third grouping of bitlines to generate the to generate the black sun reference voltage.

26. The imaging system of claim 25, wherein the third grouping of bitlines comprises 32 dummy bitlines of the plurality of bitlines.

27. The imaging system of claim 15, wherein each one of the plurality of black level clamping circuits comprises:
a black level clamping supply transistor coupled to a voltage supply;
a black level clamping source follower transistor coupled to the black level clamping supply transistor and having a gate coupled to receive the black sun reference voltage; and
a black level clamping enable transistor coupled between the black level clamping source follower transistor and a respective one of the plurality of bitlines.

28. The imaging system of claim 27, wherein the black level calibration circuit is a replica of each one of the plurality of black level clamping circuits, wherein the black level calibration circuit comprises:
a black level calibration supply transistor coupled to the voltage supply;
a black level calibration source follower transistor coupled to the black level calibration supply transistor and having a gate coupled to receive the black sun reference voltage; and
a black level calibration enable transistor coupled between the black level calibration source follower transistor and the black sun feedback circuit.

29. The imaging system of claim 15, wherein the black sun feedback circuit comprises an operational amplifier having an inverting input coupled to receive the black sun calibration voltage, a non-inverting input coupled to receive the black level sample reference, and an output coupled to generate the black sun reference voltage in response to the black sun calibration voltage and the black level sample reference.

* * * * *